United States Patent [19]

Berkenblit et al.

[11] 4,011,060
[45] Mar. 8, 1977

[54] METHOD OF CONTROLLING THE SOFTENING POINT OF SOLDER GLASS

[75] Inventors: Melvin Berkenblit, Yorktown Heights; See Ark Chan, Bronx; Joan B. Landermann, Fishkill; Arnold Reisman, Yorktown Heights; Takeshi Takamori, Croton-on-Hudson, all of N.Y.

[73] Assignee: International Business Machines Corporation, Armonk, N.Y.

[22] Filed: Oct. 2, 1975

[21] Appl. No.: 619,110

[52] U.S. Cl. .................. 65/134; 65/136; 106/52; 106/DIG. 8
[51] Int. Cl.$^2$ ......................... C03B 5/00
[58] Field of Search ............ 65/134, 135, 136; 106/52, DIG. 8

[56] References Cited
UNITED STATES PATENTS 3,057,175  10/1962  Rough et al. ............... 66/178
3,364,042  1/1968  Swain et al. ............... 65/134
3,904,426  9/1975  Frieser et al. ............. 65/134 X

OTHER PUBLICATIONS

"Elimination of $Cu_2O$ Crystals in Copper Containing Glasses" by R. G. Frieser et al., IBM Technical Disclosure Bulletin vol. 18, No. 6, Nov. 1975.

Primary Examiner—Arthur D. Kellogg
Attorney, Agent, or Firm—Pollock, Vande Sande & Priddy

[57] ABSTRACT

A process for controlling the softening point and for providing a preselected softening point of solder glass which comprises bubbling oxygen-containing gas through a homogeneous melt of a solder glass containing copper oxide at a temperature and oxygen partial pressure predetermined to provide the desired preselected softening point of the solder glass and for a time sufficient to achieve equilibrium of the reaction $Cu_2O + \tfrac{1}{2}O_2 \rightleftharpoons 2CuO$.

22 Claims, 9 Drawing Figures

METHOD OF CONTROLLING THE SOFTENING POINT OF SOLDER GLASS

BACKGROUND OF THE INVENTION

The present invention is concerned with controlling the softening point and for providing a preselected softening point of solder glass, and in particular, is directed to providing a preselected softening point of solder glass containing copper oxide.

Solder glass, as the name indicates, is glass used to join together other glasses and/or other materials. Solder glass must have a softening point lower than that of the glasses which it joins together and must have substantially the same thermal coefficient of expansion. Accordingly, one of the most important properties of a solder glass is its softening point. However, great difficulty has been experienced in controlling the softening point of solder glass including those solder glasses which contain copper oxide. Such glasses are of interest because copper additions are known to change the softening point of such glasses without perturbing significantly their coefficients of thermal expansion. Even when different batches of similar compositions are reacted to provide a particular solder glass, varying softening points have been obtained. Furthermore, on occasions the softening point has been so inconsistent that production of the solder glass has had to be shut down. Accompanying such variations in addition, undesirable precipitation of cuprous oxide may occur.

It is known that the softening point of solder glass can be altered by varying the amount of copper oxide employed in the starting composition without affecting the coefficient of thermal expansion of the final glass to any significant degree, e.g., see U.S. Pat. Nos. 3,088,833, 3,088,835, 3,127,278, 3,291,586, and 3,564,587. However, the art has not heretofore recognized any specific relationship between the copper oxide concentration and the softening point of the solder glass. Heretofore it was generally felt that the effect of copper oxide on the properties of a copper-containing glass was related to the total copper concentration rather than any particular form in which the copper existed in the composition; for example, see L. C. Hoffman et al., "A Survey of the Effect of Composition on the Internal Friction of Glass", Glass Ind., 38 (2) 81-85, 104-5 (1957).

In fact, much of the recorded work on copper-containing glasses does not even deal with solder glasses and is primarily concerned with qualitative effects of varying total copper composition rather than with effects of varying the form in which the copper is present at a constant copper composition. Furthermore, many of the prior glasses employed in such studies were very high melting materials which made it difficult, if not impossible, to accurately control oxidation and reduction reactions of copper in the glass.

It is known that copper, when present in solder glasses, exists in both the divalent and monovalent states and that with increasing temperature, the equilibrium $Cu^{2+} \rightleftharpoons Cu^+$ is shifted towards the right (see W. A. Weyl, Coloured Glasses, Chapter 11, Society of Glass Technology, Sheffield, 1951, pp. 154-167). In addition, once an equilibrium between the $Cu^+/Cu^{2+}$ ratio is achieved at an elevated temperature in a molten glass, the ratio can be preserved at lower temperatures by quickly quenching the glass as discussed by Banerjee et al., "Thermodynamics of the System Cu-0 and Ruby Formation in Borate Glass", Journal American Ceramics Society, 57 (7) 286-90 (1974). Additional prior art discussions of copper in glasses can be found in P. L. White, "Mechanical Relaxations in Copper Alumino Silicate Glasses", Physical Chemistry Glasses, 12 (1) 11-14 (1971); P. L. White, "Mechanical Relaxation of Lithium-Copper Alumino Silicate Glasses", Physical Chemistry Glasses, 12 (4) 109-10 (1971); Ram et al., "New Conception on the Origin of Color in Copper Ruby Glass", Sprechsall, 102 (9) 315-20 (1969); and Ram et al., "Viscosity of Copper Ruby Glass in and Below the Striking Range of Temperature", Glass Technology, 9 (1) 1-4 (1968).

Further prior art to the present invention, although not published prior to the filing date of the present application, is presented by Powell et al, "Thermal of $Cu^{++}$ in $PbO-B_2O_3$ Solder Glasses and Effect of $Cu^+/Cu^{++}$ Ratio on Thermal Properties of $pbO-B_2O_3$ Glass" and Frieser et al., IBM Technical Bulletin, Volume 18, No. 6, Nov. 1975. Powell et al., in said paper suggest fining of glasses containing copper oxide at various temperatures and determined that the ratio of $Cu^+/Cu^{++}$ affected certain thermal properties including the softening temperature of the glasses evaluated. Frieser et al. in said IBM Technical Disclosure Bulletin suggest a process to eliminate cuprous oxide precipitation in a copper-containing lead glass so that the predominant species in the glass in $Cu^{++}$ and not $Cu^+$ by bubbling oxygen through the molten glass. Neither Powell et al. nor Frieser et al. suggest regulating softening point by regulating the $Cu^+$ content.

However, although the use of copper in solder glasses to vary softening point, for example, is well known, no one has heretofore suggested a process for controlling $Cu^+$ to regulate and/or predetermine the softening point of the solder glass without altering the coefficient of thermal expansion. Furthermore, it was not known that the softening point of the solder glass could be accurately predetermined by properly controlling $Cu^+$ regardless of the ratio of the $Cu^+/Cu^{2+}$.

Accordingly, an object of the present invention is to provide a process for controlling the softening point of solder glass which contains copper oxide. Furthermore, an object of the present invention is to provide a process which makes it possible to preselect the softening point of solder glass containing copper oxide.

A further object of the present invention is to minimize the lot-by-lot scattering of the softening point of copper oxide containing glasses and to "tailor make" the softening point of a copper oxide containing glass of a single composition for a particular use.

The present invention makes it possible to obtain a preselected softening point of solder glass without changing the batch composition used to prepare the solder glass. Furthermore, the present invention makes it possible to obtain many different glass compositions having a range of different preselected softening points starting from only a single batch composition.

For instance, solder glass cane can be made for use in a gas discharge display panel sealing which can be designed to accommodate sealing conditions determined by other factors such as crazing problems without the necessity of changing the batch composition of the seal glass and its coefficient of thermal expansion.

The process of the present invention also makes it possible to reduce the lot-to-lot scattering which may result from prior unknown processing history of the glass such as different starting materials, unknown pulverizing conditions, unknown temperatures of melting, etc.

SUMMARY OF THE INVENTION

The present invention is concerned with a process for controlling the softening point and for providing a preselected softening point of solder glass containing copper oxide which comprises:

A. heating a solder glass composition, containing at least about 0.5% by weight of copper oxide calculated as cupric oxide, to a temperature above the softening point of the composition to provide a homogeneous melt;

B. bubbling oxygen-containing gas through said homogeneous melt for a time at least sufficient to achieve equilibrium of the following reaction:

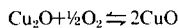

and at a temperature and oxygen partial pressure predetermined to provide the desired preselected softening point of the solder glass; and thereby C. obtaining said solder glass containing copper oxide and having said preselected softening point.

DESCRIPTION OF PREFERRED EMBODIMENTS

Figure 1:
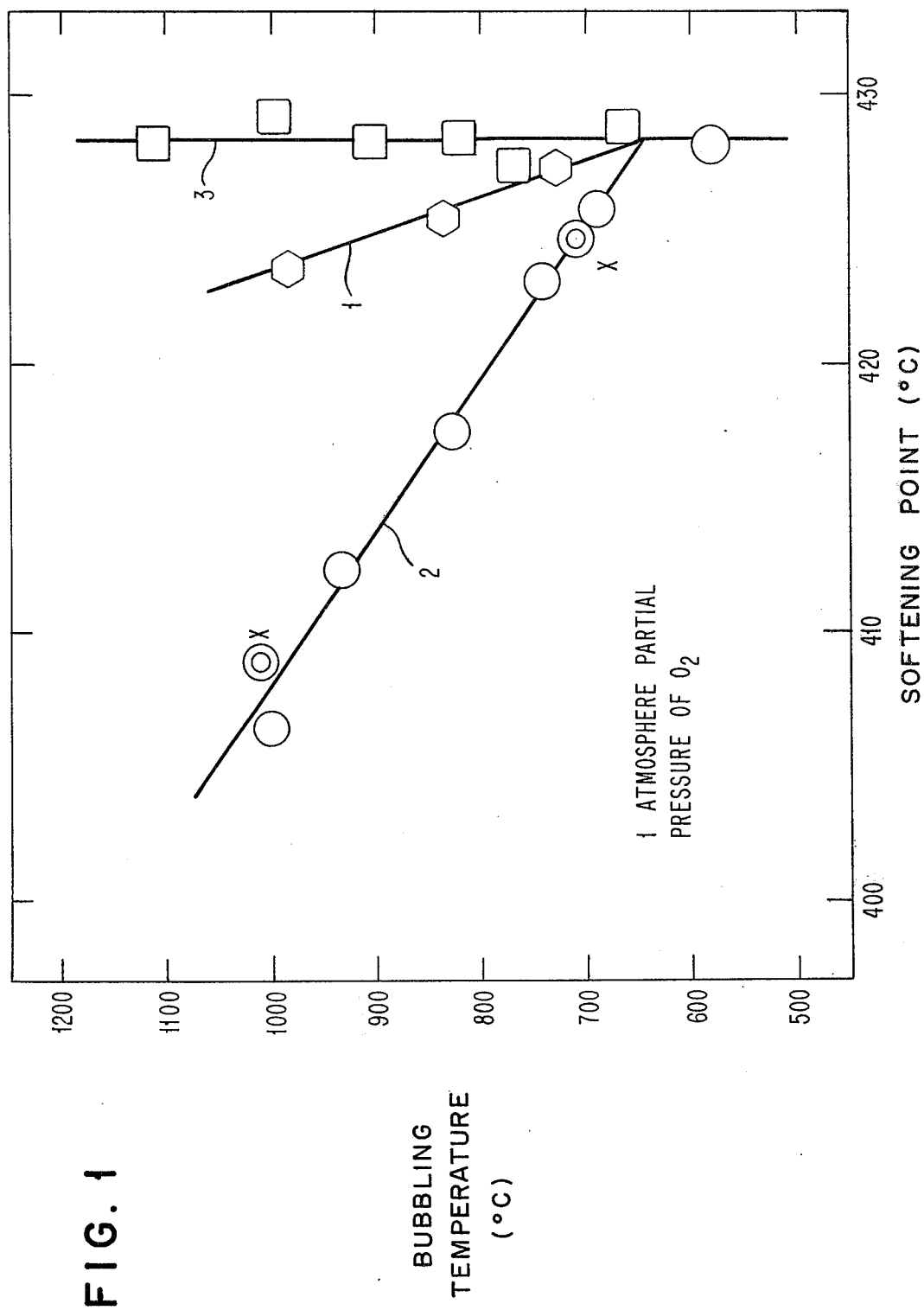
FIGS. 1, 2, and 7 are graphs illustrating the relationship between the softening point of certain glass compositions and the bubbling temperature and pressure employed in the treatment thereof.

Glasses which can be treated according to the present invention must contain at least about 0.5% by weight of copper oxide calculated as cupric oxide and must be suitable for soldering of other glasses. The solder glasses include a wide variety of glasses as will be recognized by those persons skilled in the art. The solder glass compositions employed should not be ones in which cuprous oxide precipitates out at the temperature of use or during processing. The solder glass compositions preferably are vitreous glass compositions. Vitreous glass is intended to encompass those glass compositions not intentionally designed to spontaneously produce a separate crystalline phase under the conditions of treatment and include at most a minimal tendency to crystallize. In addition, the compositions should not include copper in the form of $Cu°$.

The specific softening point desired for the glasses 300°vary so long as the softening point is lower than that softening point of the materials which the solder glass is employed to bond. Generally, the solder glasses have softening points from about 30° to about 800° C and a thermal coefficient of expansion of about $30 \times 10^{-7}/°C$ to about $120 \times 10^{-7}/°C$. The solder glass employed according to the present invention should initially contain from about 0.5 to about 20% by weight of copper oxide and preferably from about 1 to about 13% by weight copper oxide calculated as cupric oxide.

The greater the amount of copper oxide, the greater the effect of the treatment of the present invention, since a wide range of $Cu^+$ concentrations may be encompassed. The copper need not be in the form of cupric oxide in the starting melt. The term "calculated as cupric oxide" refers to the amount of copper present in the composition and not the form of the copper which is present in the composition. For instance, if all or some of the copper present is cuprous oxide, a simple calculation can be carried out to arithmetically convert the amount of copper in the form of cuprous oxide to the equivalent amount as cupric oxide so that the amount can be expressed as cupric oxide.

Examples of some suitable solder glasses treated according to the present invention include those glasses which contain amounts of the following materials calculated as the following oxides: from about 0.5 to about 20% by weight of CuO, from about 50 to about 75% by weight of pbO, from about 10 to about 20% by weight of $B_2O_3$, from about 1 to about 10% by weight of $SiO_2$, from about 1 to about 20% by weight of ZnO, from 0 to about 5% by weight of $Al_2O_3$, from 0 to about 5% by weight of $Na_2O$, from 0 to about 5% by weight of $Li_2O$, and from about 0 to about 5% by weight of $Bi_2O_3$. Another class of solder glasses suitable for employment in the present invention contain the following elements calculated as the following oxides in the following percents: from about 0.5 to about 20% by weight of CuO, from about 5 to about 25% by weight of $Li_2O$, from about 0 to about 5% by weight of $Fe_2O_3$, from about 5 to about 15% by weight of $Al_2O_3$, and from about 50 to about 75% by weight of $SiO_2$.

It is understood that numerous other solder glass compositions which contain the copper oxide can be employed so long as the resultant glasses fulfill the above-discussed requirements.

The batch compositions can be prepared by any method well known in the art and can employ any of the compounds and starting materials which have heretofore been employed. Accordingly, a detailed discussion of the preparation of the batch compositions need not be discussed herein in any great detail. One of the advantages of the present invention is that the present process makes it possible to regulate the softening point of the final copper oxide glass irrespective of the form of the materials when melted and reacted to form the batch composition. For instance, if the compounds are employed as carbonates as opposed to oxides, a batch composition would require different temperatures of reaction for preparing the glass. Therefore, without the treatment of the present invention, such compositions would result in somewhat different properties and particularly with respect to softening point even though the final total concentrations of the different elements would be the same. However, the treatment of the present invention makes it possible to regulate the softening point to a predetermined value which is not dependent upon whether the starting materials were in the form of a carbonate or an oxide or any other normally employed compound and does not depend upon the prior thermal history of the batch composition. The present invention has the beneficial effect of standardizing the final glass compositions irrespective of prior thermal history.

In order to obtain a homogeneous melt of the glass batch composition which is treated according to the present process, the batch composition is heated to a temperature above the softening point of the composition. The time of heating is not crucial and is merely that amount of time sufficient to achieve the melting. Generally, the composition is heated to a temperature from about 800° to about 1500° C and preferably to at least about 1000° C. The specific temperature of heating will be dependent upon the particular composition employed.

Next, the homogeneous melt is subjected to bubbling of an oxygen-containing gas. The oxygen-containing gas can be oxygen per se, or can be a mixture of oxygen with other gases. Preferably such other gases do not adversely affect the composition to any undesired extent. For instance, the oxygen-containing gas can be air, and mixtures of oxygen with nitrogen and/or the inert gases such as helium and argon.

The rate of bubbling and the relative amount of oxygen in the gas is predetermined to provide a preselected partial pressure of oxygen during the treatment so that the partial pressure coupled with the temperature employed will provide the desired preselected softening point of the material. In particular, the flow rate of the gas can be varied over a wide range, and preferably should be sufficient to cause some mixing or agitation of the melt particularly on the surface, and most preferably is sufficient to create a froth or foam on top of the melt. It has been observed that in the use of 100 cc crucibles, it is preferred to utilize a flow rate from about 60 to about 150 cc per minute of gas. The actual flow rate will vary depending upon the volume of the composition being treated and can readily be ascertained by persons skilled in the art on the basis of the present disclosure. Furthermore, the partial pressure of the oxygen during the treatment is above that at which either $Cu_2O$ or $Cu°$ would precipitate out of the melt. The upper range of oxygen partial pressure is primarily determined by economical and practical considerations and is preferably about 1 atmosphere since above that pressure the equipment used will have to be of special pressure-resistant design which greatly increases the expense of the process.

The preselected temperature employed in the treatment must be a temperature which together with the selected oxygen partial pressure will provide the desired preselected softening point of the solder glass. The temperature of the treatment is at or above the working point of the glass which is defined in glass technology as that temperature at which the viscosity of the glass is $10^4$ poises, and is usually between about 350° and about 1250° C and preferably between about 500° and about 1100° C for many of the more common commercial solder glass compositions. In addition, the bubbling of the oxygen must be continued for a time sufficient for the reaction $Cu_2O + \frac{1}{2}O_2 \rightleftharpoons 2CuO$ to come to equilibrium. This generally takes at least about ½ hour and in most cases at least about 1 hour. The maximum time for carrying out the reaction is merely determined by practical and economical considerations and once the equilibrium is achieved, heating by bubbling oxygen gas for a greater period of time does not alter the softening point of the composition.

An indication that equilibrium is achieved is that the same softening point is achieved of whether the temperature of bubbling is approached from above or below. In other words, for example, the glass will have the same final softening point if subjected to treatment by the present invention, whether the composition has been heated above the bubbling temperature for the melting and then cooled down to the bubbling temperature or whether the composition has been heated above the bubbling temperature, cooled down below the bubbling temperature and then reheated up to the bubbling temperature.

Figure 2:
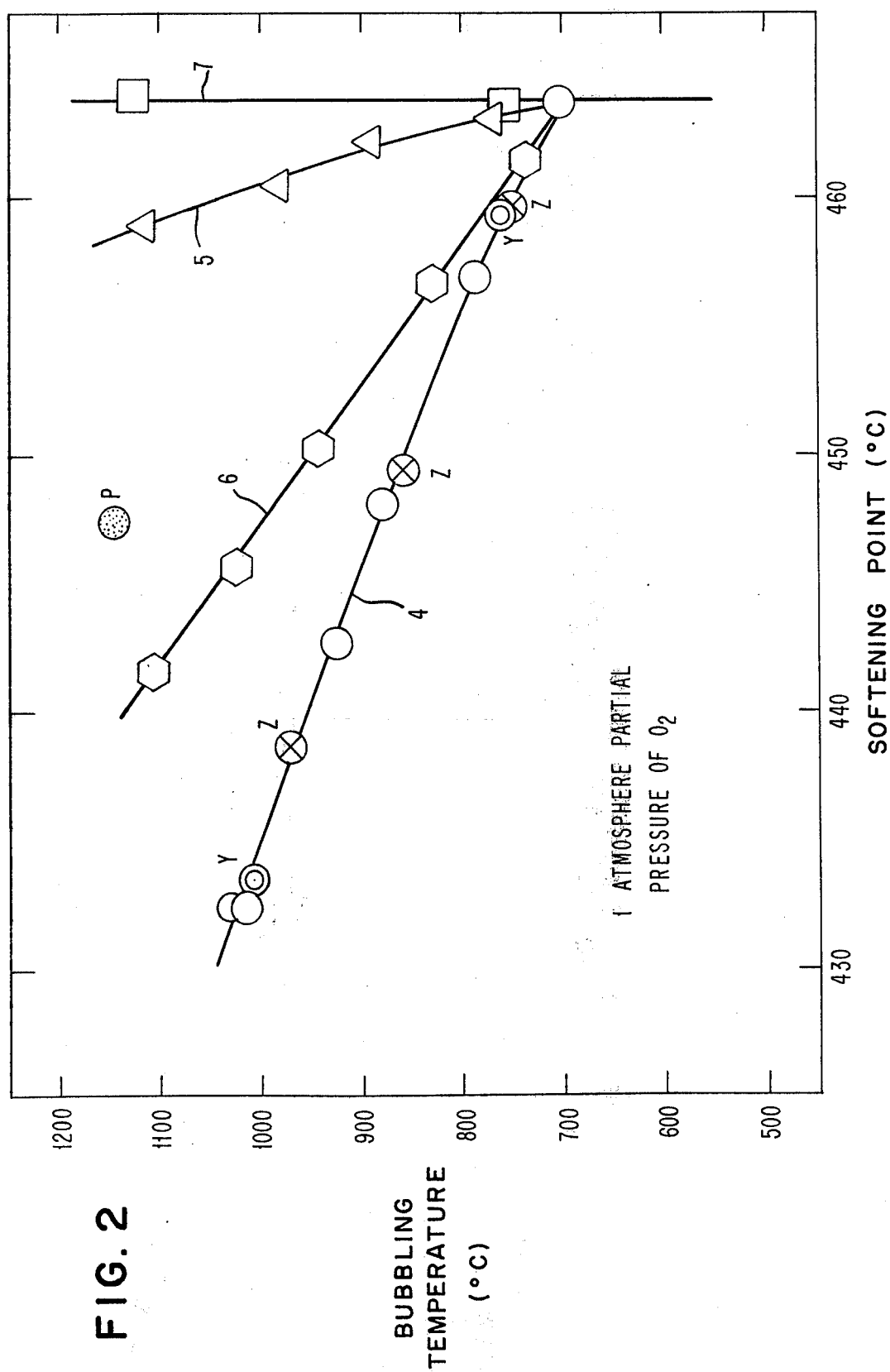
Figure 7:
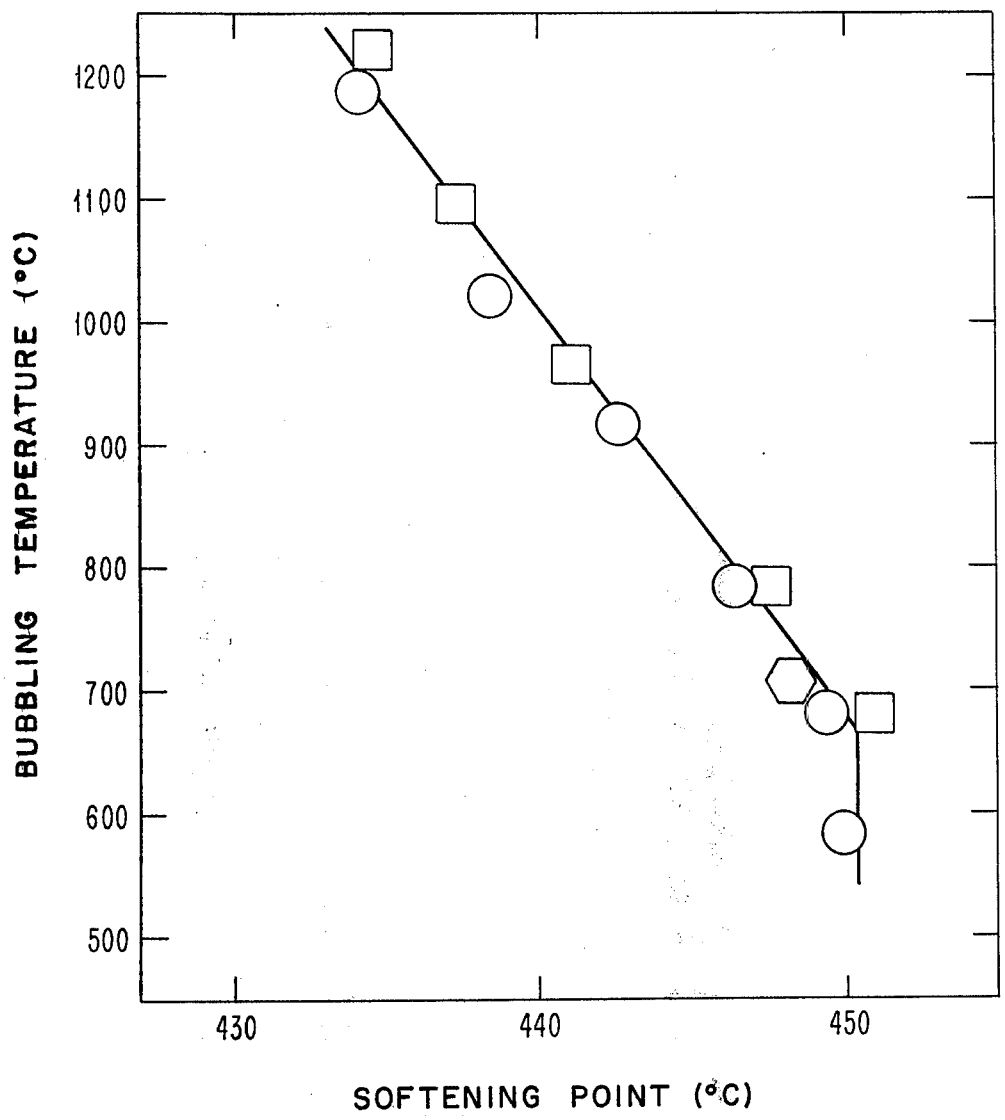

The selection of a predetermined pressure and temperature to provide a specific preselected softening point is achieved by preparing standard calibration curves for particular compositions, which can be done by routine experimentation. In particular, a specific starting glass composition as will be described hereinbelow can be subjected to various temperatures of bubbling oxygen while the pressure is maintained at a constant level. The values of the softening points measured for the various temperatures are then plotted to provide a curve of temperature versus softening point. Thereafter when using a melt of the same composition employed to set up a standard graph, a softening point within the curve can be chosen and one then merely has to use the temperature of treatment which corresponds to the selected softening point at the pressure employed. If a new pressure is selected, then a new set of curves at varying temperatures would have to be obtained in order to be able to select the predetermined temperature and pressure for a particular softening point. Likewise, standard curves can be obtained by holding the temperature at a constant value and by varying the partial pressure of the oxygen. In such instance, then the curve would be a plot of the softening points obtained at different oxygen partial pressures all at constant bubbling temperature. It is preferred that the temperature of the treatment when the oxygen partial pressure is varied, be maintained at a temperature wherein substantially all of the Cu in the composition is $Cu^{2+}$, and is generally between about 350° and about 750° C. The temperature of the treatment, when the oxygen partial pressure is varied, can be greater than said preferred temperature, if desired. FIGS. 1, 2 and 7 are illustrative of certain standard curves which have been prepared according to the present invention.

The composition, after the treatment with the oxygen-containing gas, is then permitted to cool down below the temperature of treatment so that it can be further worked according to the particular form in which the solder glass is to be employed. It is preferred that the cooling be done at a rate sufficient to prevent the equilibrium from changing. Cooling down 100° C in about one hour is more than adequate to prevent any change in equilibrium. Mere contact with air during such cooling, as opposed to bubbling even at the highest temperature contemplated, requires considerably more time to affect the $Cu^+/Cu^{2+}$ ratio. For instance, even at the higher temperatures, soaking in oxygen atmosphere at the same temperature of bubbling instead of bubbling would require at least about 12 times the amount of time necessary for changing the equilibrium. For a discussion of soaking, see Banerjee et al., "Thermodynamics of the System Cu-O and Ruby Formation in Borate Glass", J. Amer. Ceram. Soc., 57 (7) 286-90 (1974). A cooling rate of about 5° to 20° C/minute can conveniently be achieved when desired.

The solder glass can be used in the form of rods or fibers commonly called cane or can be ground up into small particles and used in the form commonly known as frit. In addition, when used as frit, generally a binder material as well known in the art is admixed with the solder glass.

When it is desired to prepare cane, the treated solder glass composition is cooled down to a temperature wherein the viscosity of the composition is approximately $10^3$ to about $10^4$ poises, which occurs for many conventional solder glass compositions at temperatures between about 100° C and about 170° C above the softening point of the solder glass. Accordingly, when solder glass cane is to be prepared, it is preferable to cool the melt down after the treatment with the oxygen to a temperature between about 100° and about 170° C above the softening point of the solder glass in less than about 1 hour. Of course, even when the composition is to be used in the form of cane, it can be cooled down to room temperature or somewhere between room temperature and the softening point and then at some later time heated up to a temperature adequate to provide the desired viscosity suitable for preparing the rods or fibers. When the solder glass composition is used in the form of frit, it is generally cooled down to a fairly solid form wherein it can be reduced in particle size to provide frit.

The manner in which the compositions are drawn into fibers or produced into frit need not be described herein in any detail since such are well known in the prior art. Likewise, the manner of using the solder glass as a solder to unite other glass materials is well known and need not be described in any great detail.

The following nonlimiting examples are given to further illustrate the present invention. All parts are by weight unless the contrary is stated.

EXAMPLE 1

A lead borate glass batch composition of about 66.4 weight percent lead oxide calculated as PbO, about 14 weight percent boron oxide calculated as $B_2O_3$, about 2.5 weight percent silicon oxide calculated as $SiO_2$, about 2.1 weight percent aluminum oxide calculated as $Al_2O_3$, about 14 weight percent zinc oxide calculated as ZnO, and about 1 percent copper oxide calculated as CuO is prepared by reacting about 400 grams of the starting materials in a 100 cc Pt crucible at about 1000° C. The starting source for CuO is the carbonate while the other constituents are added as oxides.

The Pt crucible, containing the pre-reacted glass sample is placed in a furnace controlled at a desired temperature to within ± 10° C. A platinum sheathed thermocouple is then dipped into the glass melt. When the temperature of the molten glass has stabilized, dry oxygen is bubbled through the melt via a Pt tube for at least about 1 hour. Preliminary experiments indicate that as long as the surface of the melt is agitated continuously by the bubbling gas, the flow rate of the oxygen is unimportant in obtaining reproducible and reversible results as a function of temperature and pressure. During the bubbling, the furnace is covered with a refractory lid. With this technique the $O_2$ atmosphere surrounding the molten glass is about 1 atm. The $O_2$-bubbling temperatures of this example should be considered, therefore, as the temperatures at which the glasses are in equilibrium with a partial pressure of $O_2$ of 1 atm. Samples for studying several equilibration temperatures are often taken from a single batch of melt. In order to preclude introduction of a systematic error, bubbling temperatures of such samples are randomized. After the oxygen bubbling, the melt is cooled to about 150° C above the softening point of the solder glass.

The specimens for subsequent measurements are prepared at this lower temperature in the following way.

Canes of about 3 mm diameter are fabricated by quickly drawing the molten glass into fused quartz tubing (1 mm wall thickness), which, after being cooled in air, can be separated easily from the solder glass. No evidence of chemical reaction between the solder and quartz tubing is observed. The canes are cut into 50 mm lengths for dilatometric measurements. Fibers for softening point measurements are pulled directly from the melt in the crucible.

The changes in viscosity have been represented as softening point changes, which is acceptable since the temperature coefficient of the viscosity of lead borate based glasses in the region, $10^7$–$10^{15}$ poises is almost identical through a wide range of compositional change (see John Gallup et al., "Properties of Low-Temperature Solder Glasses", Amer. Cerm. Soc. Bull. 36 (2) 47–51 (1957).

ASTM procedure C-338-57 is followed for softening point measurements and for each sample type at least 5 measurements are conducted and averaged in an effort to improve the precision of the data to within a fraction of a degree. The softening point furnace is calibrated using standard reference materials available from the National Bureau of Standards.

Since all the sample glasses are prepared essentially under one atmosphere of oxygen, the amount of Cu° in the glass, if any, is considered to be negligible. [See W. D. Johnson et al., "Oxidation-Reduction Equilibria in Molten $Na_2.2SiO_2$ Glass in Contact with Metallic Copper and Silver", J. Amer. Ceram. Soc., 49 (10) 562-64 (1966)].

The amount of $Cu^+$ is determined analytically by adding dilute HCl containing $Fe^{3+}$ to the sample to oxidize the $Cu^+$ to $Cu^{2+}$ and then titrating the reduced $Fe^{2+}$ with $Ce^{4+}$. The amount of $Cu^{2+}$ is derived as the difference between the total copper and $Cu^+$. The total amount of copper in the sample glass is determined by atomic absorption measurements of the sample dissolved in $HNO_3$. The precision obtained is ± 3%. It is found that the major and minor constituents of the glass do not interfere with the copper determination.

Curve 1 in FIG. 1 illustrates the relationship of softening point to bubbling temperature at about 1 atmosphere of oxygen partial pressure for the composition of Example 1.

EXAMPLE 2

The general procedure of Example 1 is repeated except that the batch composition employed contains about 66.4 weight percent lead oxide calculated as PbO, about 14 weight percent boron oxide calculated as $B_2O_3$, about 2.5 weight percent silicon oxide calculated as $SiO_2$, about 2.1 weight percent aluminum oxide calculated as $Al_2O_3$, about 10 weight percent zinc oxide calculated as ZnO, and about 5 percent copper oxide calculated as CuO.

Curve 2 in FIG. 1 illustrates the relationship of softening point to bubbling temperature at about 1 atmosphere of oxygen partial pressure for the composition employed in Example 2. Those data points marked X on curve 2 of FIG. 1 represent experiments conducted with second batches of the same glass compositions. They indicate the reproducibility of equilibrating different batches of the same glass.

COMPARISON EXAMPLE 3

The general procedure of Example 1 is repeated except that the batch composition employed does not contain copper oxide but contains about 66.4 weight percent lead oxide calculated as PbO, about 14 weight percent boron oxide calculated as $B_2O_3$, about 2.5 weight percent silicon oxide calculated as $SiO_2$, about 2.1 weight percent aluminum oxide calculated as $Al_2O_3$, and about 15 weight percent zinc oxide calculated as ZnO.

Curve 3 in FIG. 1 illustrates the relationship of softening to bubbling temperature at about 1 atmosphere of oxygen partial pressure for the composition employed in Example 3.

FIG. 1 demonstrates that for the glass compositions containing copper oxide, changes in oxygen treatment temperatures cause significant changes in the softening point of each of the glasses, the changes being most dramatic for those glasses having higher starting copper compositions. On the other hand, changes in oxygen equilibration temperatures have no significant effect on the softening points of the ZnO reference glasses, which do not contain copper.

It is further noted that as the $O_2$-bubbling temperature is lowered, the softening point curves of each of the series converge to a point where the Cu containing glasses behave in the same manner as the reference glass, i.e., the glasses containing ZnO but no copper oxide. This is the point where all the copper is substantially in the form of $Cu^{2+}$ and represents the highest softening point achieved for the particular glass composition. When the process is practiced by varying the pressure and maintaining the temperature constant, it is preferred to employ a temperature at or below the temperature at this point.

ZnO glasses are chosen as reference materials since the Zn persists in the 2+ valence state under all of the redox conditions employed. The time of bubbling in the above examples is adequate to ensure that equilibrium $Cu^+/Cu^{2+}$ ratios are obtained.

EXAMPLE 4

The general procedure of Example 1 is repeated except that the batch composition employed contains about 64 weight percent of lead oxide calculated as PbO, about 16 weight percent boron oxide calculated as $B_2O_3$, about 6 weight percent silicon oxide calculated as $SiO_2$, about 4 weight percent zinc oxide calculated as ZnO, and about 10 weight percent copper oxide calculated as CuO, and the glasses are bubbled for 2 hours.

Curve 4 in FIG. 2 illustrates the relationship of softening point to bubbling temperature at about 1 atmosphere of oxygen partial pressure for the composition employed in Example 4.

Crystalline precipitate results following oxygen bubbling at around 1150° C and subsequent cooling of the melt. The fibers drawn on such precipitated glass are lumpy and brittle, and quite marginal for softening point measurements. This precipitation is not caused by vaporization loss of the components, since the same melt can be reversed readily, after precipitation has occurred, to yield a vitreous glass by simply remelting and re-equilibrating at lower temperatures. The precipitation is attributable to exceeding the solubility limit of $Cu_2O$ in the base glass. The "apparent" softening point of this heterogeneous sample showed a significant shift to a higher temperature as illustrated by the point P in FIG. 2 for this glass.

Also, thermal expansion measurements are made with a vertical dilatometer of the optical lever type having a reproducibility of approximately ± 10 ppm. Relative expansions of annealed samples are compared with fused silica using a heating rate of 2.5°–3° C/min. Reproducibility of the coefficient of thermal expansion in the temperature interval 30°–300° on different samples is ± $0.5 \times 10^{-7}$/° C.

The chemical durability of some of the glasses evaluated by study of their reactions with liquid and vaporous $H_2O$. The reaction of the glasses with liquid $H_2O$ is estimated using a simplified version of the water leaching unit described by Rana and Douglas in "The Reaction Between Glass and Water. Part I. Experimental Methods and Observations", Phys. Chem. Glasses, 2 (6) 179-95 (1961).

The solubility is defined as weight loss (mg/cm$^3$) after soaking granular samples (30–50 mesh) with distilled wate at 98° C for 6 hours. Hygroscopicity of glasses or the reaction with $H_2O$ vapor is determined, on the other hand, by the method proposed by Hubbard, "Hygroscopicity of Optical Glasses as an Indicator of Serviceablility", J. Res. Natl. Bur. Stands. 36 365–75 (1946).

The weight increases (mg/cm$^3$) of granular samples (30–50 mesh) is determined after exposing them to 95% relative humidity for 14 days at 80° C. A vitreous carbon container is useful for this purpose because of its extreme inertness to humidity. The volumes of the different glasses examined are adjusted to be equal, based on their densities, as determined using the Archimedes method, as shown in Table I, infra.

EXAMPLE 5

The procedure of Example 4 is repeated except that the batch composition employed contains about 64 weight percent of lead oxide calculated as PbO, about 16 weight percent boron oxide calculated as $B_2O_3$, about 6 weight percent silicon oxide calculated as $SiO_2$, about 13 weight percent zinc oxide calculated as ZnO and about 1 weight percent copper oxide calculated as CuO.

Curve 5 in FIG. 2 illustrates the relationship of softening point to bubbling temperature at about 1 atmosphere of oxygen partial pressure for the composition employed in Example 5.

EXAMPLE 6

The procedure of Example 4 is a repeated except that the batch composition employed contains about 64 weight percent of lead oxide calculated as PbO, about 16 weight percent boron oxide calculated as $B_2O_3$, about 6 weight percent silicon oxide calculated as $SiO_2$, about 9 weight percent zince oxide calculated as ZnO, and about 5 weight percent copper oxide calculated as CuO.

Curve 6 in FIG. 2 illustrates the relationship of softening point to bubbling temperature at about 1 atmosphere of oxygen partial pressure for the composition employed in Example 6.

COMPARISON EXAMPLE 7

The general procedure of Example 1 is repeated except that the batch composition employed does not contain copper oxide but contains about 64 weight percent of lead oxide calculated as PbO, about 16 weight percent boron oxide calculated as $B_2O_3$, about 6 weight percent silicon oxide calculated as $SiO_2$, and about 14 weight percent zinc oxide calculated as ZnO.

Curve 7 in FIG. 2 illustrates the relationship of softening point to bubbling temperature at about 1 atmosphere of oxygen partial pressure for the composition employed in Example 7. Those data points marked Y and Z in FIG. 2 represent experiments conducted with second and third batches of the glasses of Example 4. These indicate the reproducibility of equilibrating different batches of the same glass.

Figure 3:
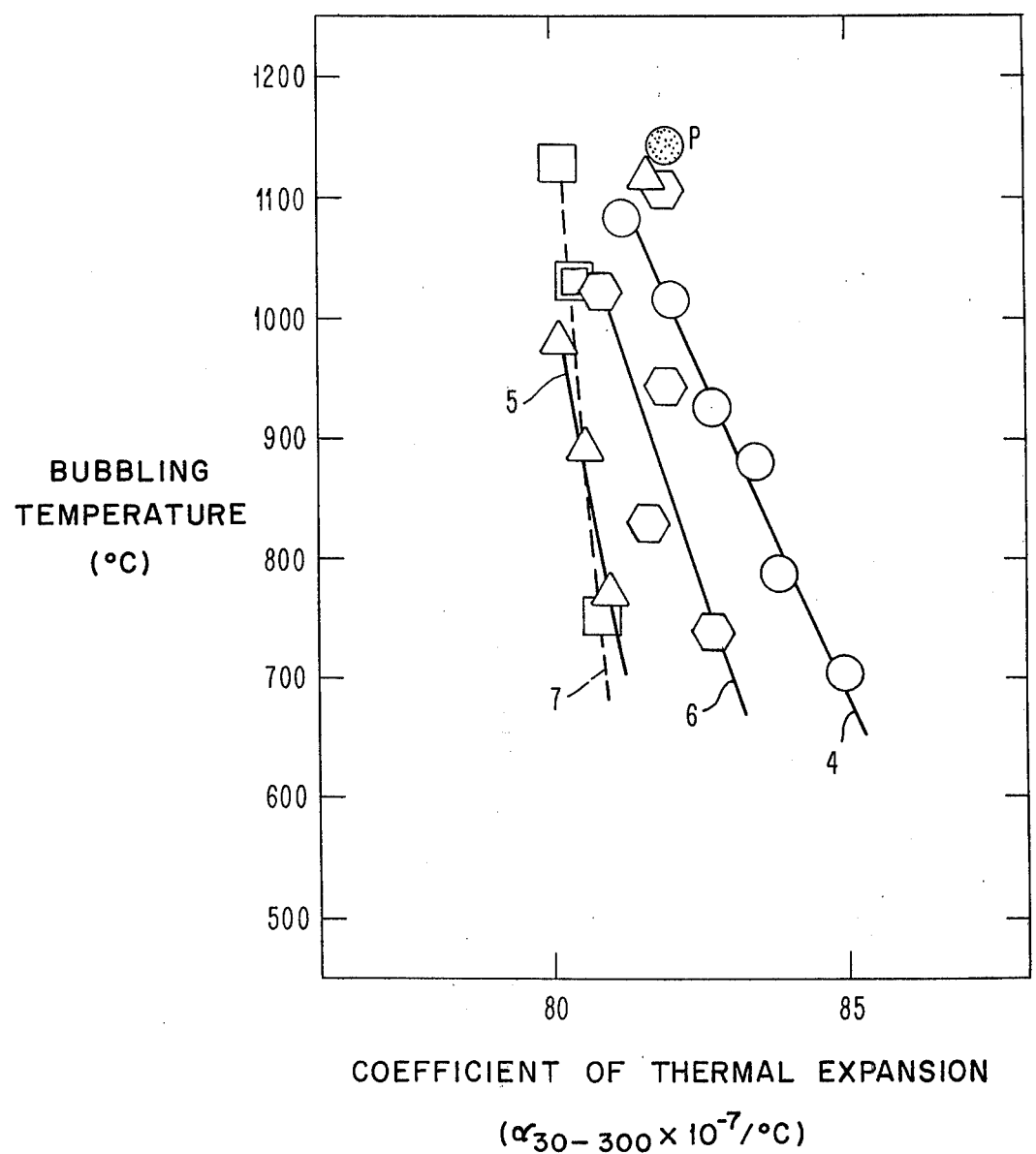
FIG. 3 illustrates the relationship between the coefficient of thermal expansion of certain glasses and the bubbling temperature.

FIG. 3 shows the dependency of the average coefficient of thermal expansion from 30° to 300° C on the glasses of Examples 4–7 as a function of oxygen bubbling temperature. In contrast to the softening point behavior described above, the change in thermal expansion coefficient with change in $O_2$-bubbling temperature is comparatively small. It is noted from FIG. 3 that the coefficient of thermal expansion decreases when the softening point is lowered by treating the glasses at higher $O_2$-bubbling temperatures. It is a generally accepted rule of thumb that in most known cases involving compositional manipulation of glasses, the coefficient of thermal expansion increases when the softening point decreases.

Figure 4:
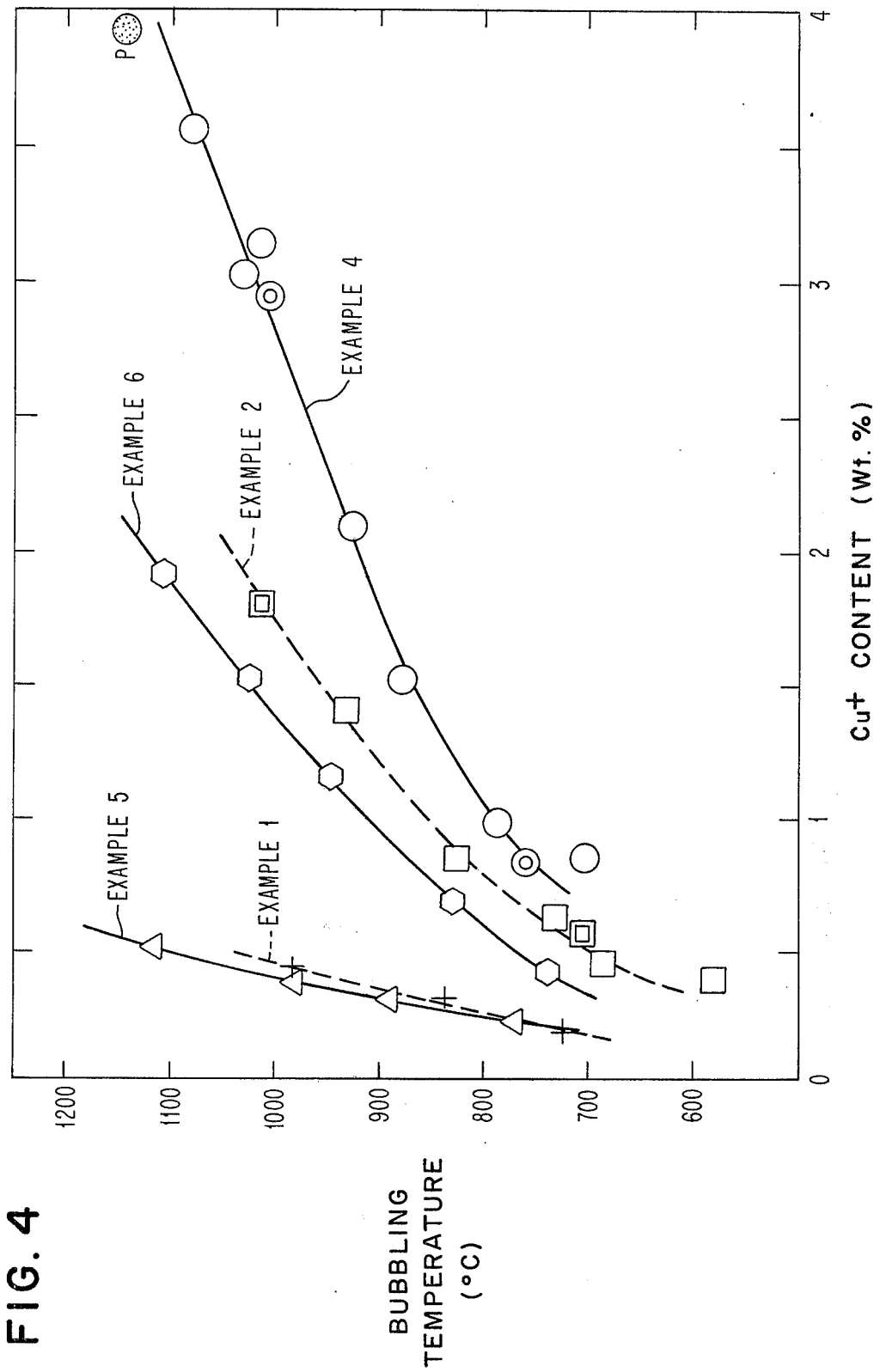
FIG. 4 is a graph illustrating the relationship between the change in $Cu^+$ content in the glass and the bubbling temperature.

The analyzed $Cu^+$ contents of the several glasses studied, as a function of $O_2$-bubbling temperature, are shown in FIG. 4. It is seen that the $Cu^+$ content of each of the glasses increases with increasing bubbling temperature, and that at a given bubbling temperature, glasses with a higher copper oxide starting composition show a higher $Cu^+$ content. FIG. 4, together with FIGS. 1 and 2, indicates that the softening point of a copper containing solder glass of the type being discussed is related closely to the $Cu^+$ content. As the $Cu^+$ content is decreased, by lowering the oxygen bubbling temperature, the $Cu^{2+}$ content increases, and the glass becomes more like a glass containing ZnO but no copper. Since glasses with larger copper oxide starting compositions undergo a larger conversion of $Cu^{2+}$ to $Cu^+$ at a given bubbling temperature, FIGS. 1 and 2, the effects are more dramatic in glasses containing more copper.

Figure 5:
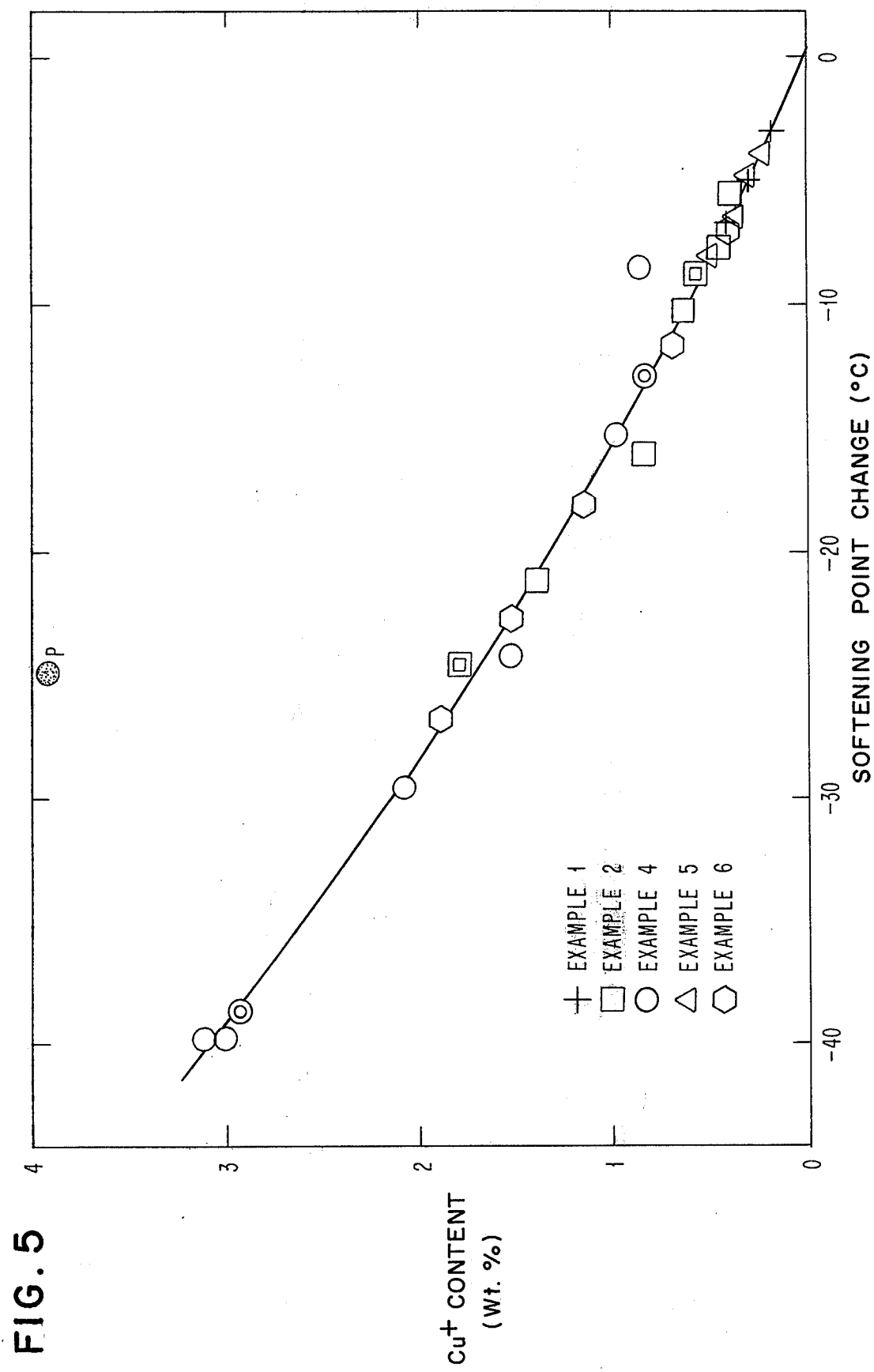
FIG. 5 is a graph illustrating a universal relationship between the percent change in $Cu^+$ and the change in softening point in the solder glass, applicable to a wide variety of copper-containing solder glasses.

By combining FIGS. 1, 2, and 4, the graph shown in FIG. 5 is generated which depicts the change of softening with a change in $Cu^+$ content. The curve in FIG. 5 is obtained in the following way. Plots of $Cu^+$ content versus softening point for each glass are shifted along the x-axis until the curves overlapped. Then, the origin for the softening point change is chosen as the point where the extrapolation of the single resulting curve intersects the x-axis of zero $Cu^+$ content.

In FIG. 5, it is seen that in all of the glasses examined, a given change in $Cu^+$ weight percent content results in exactly the same change in softening point, even though the absolute value of the softening points of the glasses are different. This result also indicates that the observed softening point effects are attributable solely to changes in $Cu^+$ content. The data in FIG. 5 indicate that the softening point of the lead borate based glasses vary by about 11°–16° C per 1 weight percent change of $Cu^+$.

As the weight percent of $Cu^+$ approaches zero, the softening point of these glasses becomes independent of the copper content of the glasses and approximates that of the ZnO reference glass.

On the other hand, from FIG. 3 it is seen that replacement of $Zn^{2+}$ by $Cu^{2+}$ causes an increase in the coefficient of thermal expansion of the glasses in a small but measurable fashion. This rise in the thermal expansion coefficient is counteracted when the $O_2$-bubbling temperature is raised which results in an increase in the $Cu^+/Cu^{2+}$ ratio. Apparently, therefore, the $Cu^+$ ion again plays a unique role in determining the thermal expansion characteristics of the glass, contributing negatively to the coefficient. This tendency is opposite that observed with other monovalent ions, as will be discussed hereinbelow.

Figure 6:
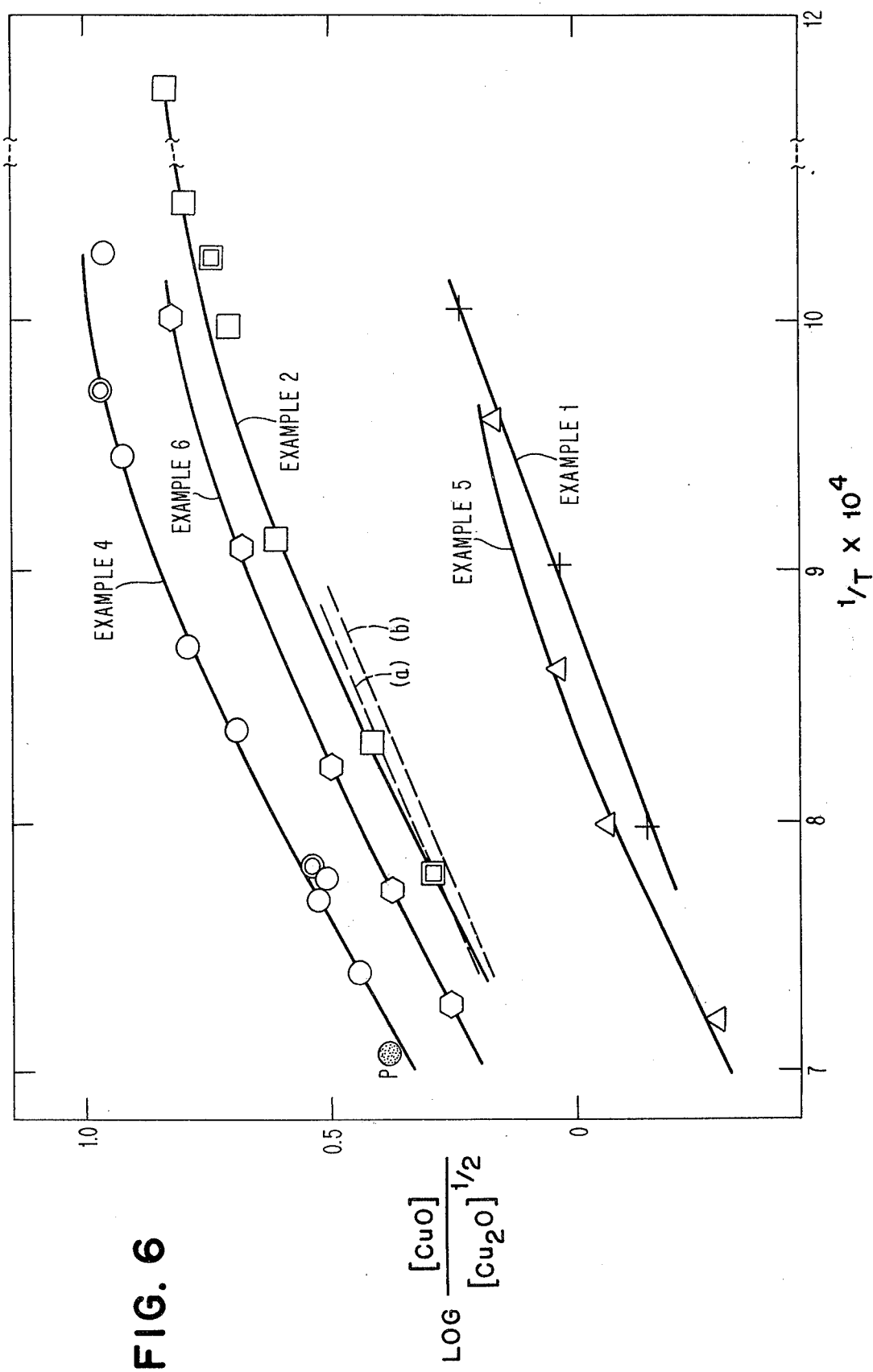
FIG. 6 is a graph illustrating the relationship between the ratio $[CuO]/[Cu_2O]^{\frac{1}{2}}$ and the bubbling temperature.

Reciprocals of the equilibrium temperatures (in °K) are plotted against $\log[CuO]/[Cu_2O]^{1/2}$ (where the concentrations are in weight percent) as shown in FIG. 6. The dashed curves are from the results reported by Banerjee and Paul in "Thermodynamics of the System Cu-O and Ring Formation in Borate Glass", J. Amer. Ceram. Soc. 57 (7) 286–90 (1974). Curve (a) represents the behavior of a 30 $Na_2O$ – 70 $B_2O_3$ base glass with 0.5 weight percent Cu, and (b) the behavior of a 25$Na_2O$-10$Al_2O_3$-65$B_2O_3$ glass with 0.5 weight percent CuO both in air ($P_O \approx 0.2$ atm). It is seen from FIG. 6 that the data yield fairly straight line relationships at higher temperatures and become sublinear at lower temperatures. This may indicate a large variation in enthalpy of reaction with temperature. A general observation is that the curves are fairly parallel to one another indicating that independent of the variation in base glass composition, copper oxide content or ambient partial pressure of oxygen, the enthalpy for the $CuO$-$Cu_2O$ equilibrium is essentially unaltered, as might have been expected. That the equilibrium constants themselves are different indicates that the entropy of reaction is affected by parameters such as base glass composition. Based on the equilibrium, $(\frac{1}{2})Cu_2O + (\frac{1}{4})O_2 \rightleftharpoons CuO$, the enthalpy of reaction derived from the data above 900° C lies in the range $-10 \pm 1.5$ Kcal/mole.

EXAMPLE 8

The general procedure of Example 1 is repeated except that glasses employed are from different batches of a solder glass available from Kimble under the trade designation SG-67 and contain about 63.5 to 65.7 weight percent of lead oxide calculated as PbO, about 15.6 to 16.4 weight percent boron oxide calculated as $B_2O_3$, about 2.8–3.0 weight percent silicon oxide calculated as $SiO_2$, about 9.5–9.8 weight percent zinc oxide calculated as ZnO, about 2.9–4.0 weight percent copper oxide calculated as CuO and about 2.9–3.1 weight percent aluminum oxide calculated as $Al_2O_3$.

FIG. 7 illustrates the relationship of softening point to bubbling temperature at about 1 atmosphere of oxygen partial pressure for the composition employed in Example 8.

COMPARISON EXAMPLE 9

The procedure of Example 1 is repeated except that the batch composition employed does not contain copper oxide but contains about 64 weight percent of lead oxide calculated as PbO, about 16 weight percent boron oxide calculated as $B_2O_3$, about 6 weight percent silicon oxide calculated as $SiO_2$, about 13 weight percent zinc oxide calculated as ZnO, and about 0.39 weight percent sodium oxide calculated as $Na_2O$. The source for the $Na_2O$ is the carbonate.

COMPARISON EXAMPLE 10

The procedure of Example 1 is repeated except that the batch composition employed does not contain copper oxide but contains about 64 weight percent of lead oxide calculated as PbO, about 16 weight percent boron oxide calculated as $B_2O_3$, about 6 weight percent silicon oxide calculated as $SiO_2$, about 9 weight percent zinc oxide calculated as ZnO, and about 1.95 weight percent sodium oxide calculated as $Na_2O$.

COMPARISON EXAMPLE 11

The procedure of Example 1 is repeated except that the batch composition employed does not contain copper but contains about 64 weight percent of lead oxide calculated as PbO, about 16 weight percent boron oxide calculated as $B_2O_3$, about 6 weight percent silicon oxide calculated as $SiO_2$, about 4 weight percent zinc oxide calculated as ZnO, and about 3.9 weight percent sodium oxide calculated as $Na_2O$.

Figure 8:
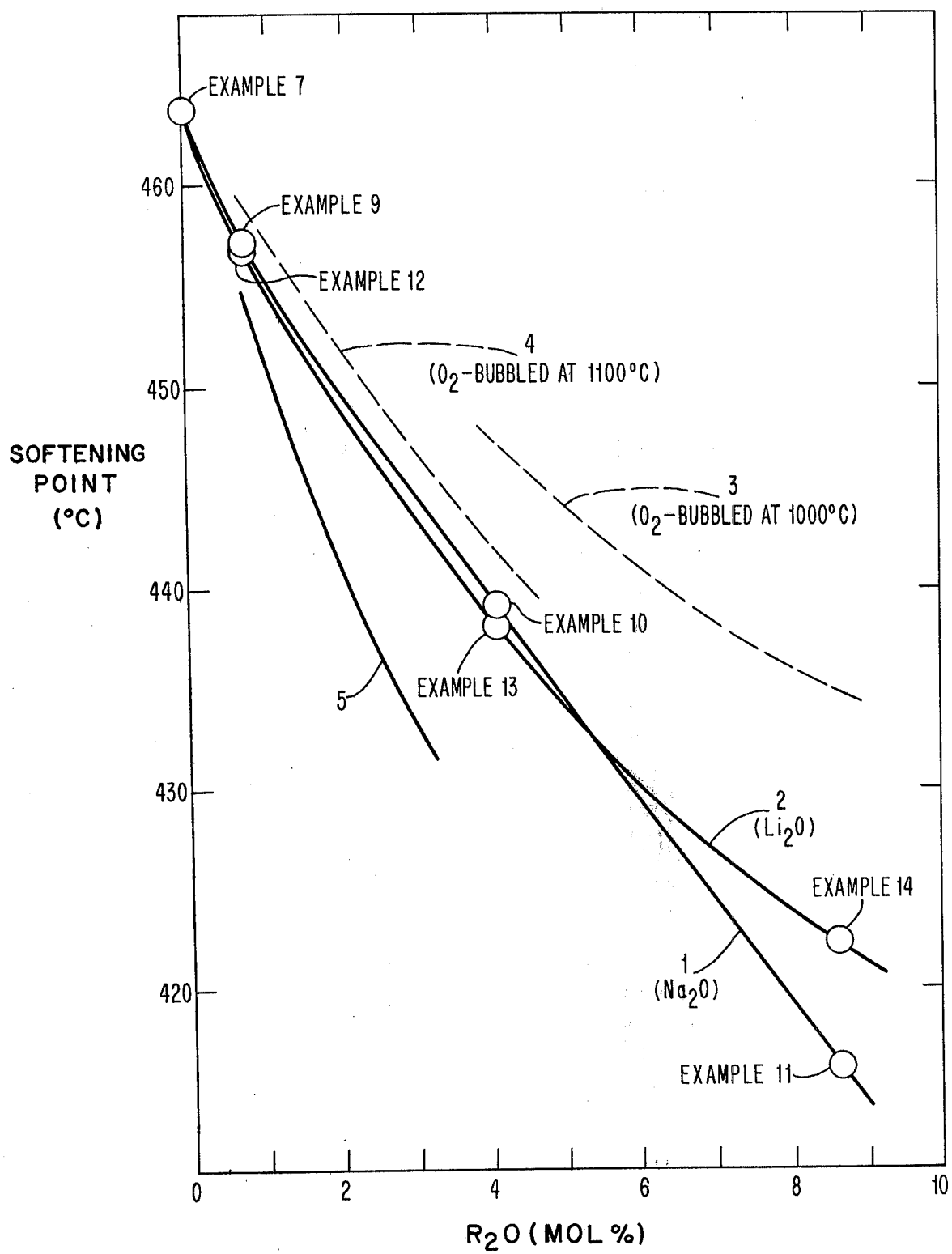
FIG. 8 is a graph illustrating the effect of Cu ions on the softening point of the solder glass as compared to the effect of alkali metal ions.

Curve 1 in FIG. 8 illustrates the relationship of softening point to mole percent of $Na_2O$ for the composition employed in Examples 9–11.

Figure 9:
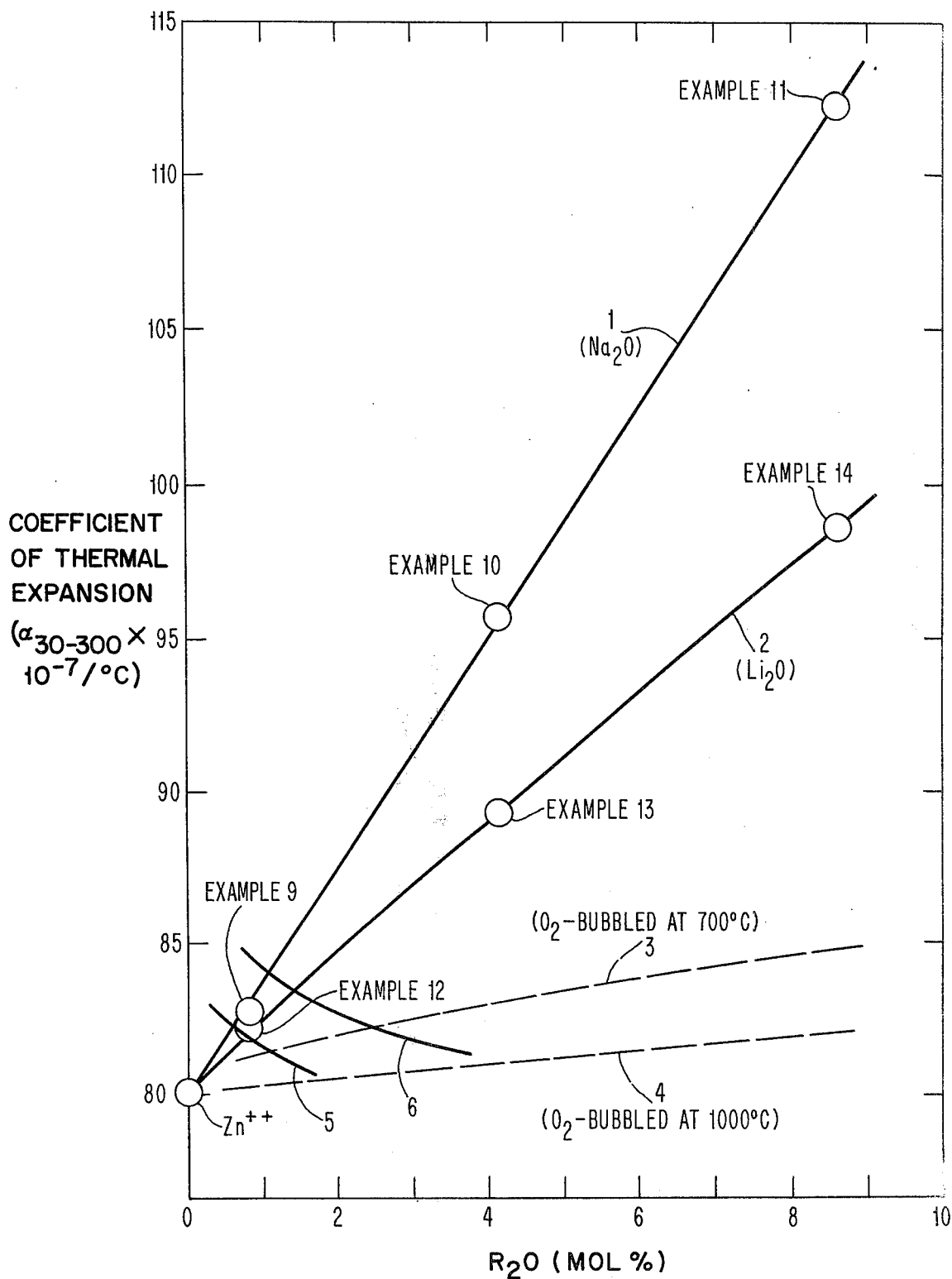
FIG. 9 is a graph illustrating the effect of Cu ions on the thermal expansion coefficients as compared with those of alkali metal ions.

Curve 1 in FIG. 9 illustrates the relationship of coefficient of thermal expansion to mole percent of $Na_2O$ for the compositions employed in Examples 9–11.

COMPARISON EXAMPLE 12

The general procedure of Example 1 is repeated except that the batch composition employed does not contain copper but contains about 64 weight percent of lead oxide calculated as PbO, about 16 weight percent boron oxide calculated as $B_2O_3$, about 6 weight percent silicon oxide calculated as $SiO_2$, about 13 weight percent zinc oxide calculated as ZnO, and about 0.188 weight percent lithium oxide calculated as $Li_2O$.

COMPARISON EXAMPLE 13

The general procedure of Example 1 is repeated except that the batch composition employed contains about 64 weight percent of lead oxide calculated as PbO, about 16 weight percent boron oxide calculated as $B_2O_3$, about 6 weight percent silicon oxide calculated as $SiO_2$, about 9 weight percent zinc oxide calculated as ZnO, and about 0.939 weight percent lithium oxide calculated as $Li_2O$.

COMPARISON EXAMPLE 14

The general procedure of Example 1 is repeated except that the batch composition employed contains about 64 weight percent of lead oxide calculated as PbO, about 16 weight percent boron oxide calculated as $B_2O_3$, about 6 weight percent silicon oxide calculated as $SiO_2$, about 4 weight percent zinc oxide calculated as ZnO, and about 1.88 weight percent lithium oxide calculated as $Li_2O$.

Curve 2 in FIG. 8 illustrates the relationship of softening point to mole percent of $LiO_2$ for the compositions employed in Examples 12–14.

Curve 2 in FIG. 9 illustrates the relationship of coefficient of thermal expansion to mole percent of $Li_2O$ for the compositions employed in Examples 12–14.

FIGS. 8 and 9 compare the effects of $Cu^+$ ions on the softening points and thermal expansion characteristics, respectively, with those of alkali metal ions. For this comparison, CuO in the starting composition of glasses of Examples 4–6 is replaced by an amount of $Na_2O$ or $Li_2O$ such that the number of alkali metal atoms per unit quantity of base glass is the same as in the copper-containing analogs. Thus, for each mole of CuO added, 0.5 mole of alkali metal oxide is added. The alkali metal containing glasses would contain these metals in the 1+ state under all of the redox conditions employed. The data for the copper glasses is plotted in two different ways. First, the compositions of copper-containing glasses which are oxygen-bubbled at two different temperatures, 1000° and 1100° C, curves 3 and 4, in FIG. 8, respectively, are specified on the basis of the copper being present as the component $Cu_2O$ instead of CuO. Second, based on the analytical results obtained on these glasses, only the $Cu^+$ content of these equilibrated glasses is used for calculating the $Cu_2O$ mole percent, these data being plotted in curve 5.

As might have been anticipated, an increase in alkali metal oxide content results in a decrease in the softening point, FIG. 8. From curve 5, FIG. 8, however, it is seen that $Cu^+$ is more effective in causing such a depression. In real glasses, curves 3 and 4, where part of the $Cu_2O$ component composition is derived from the $Cu^{2+}$ species, the softening point effect is diluted and more nearly approximates the behavior of the alkali metal ions. As in FIG. 8, curves 3 and 4 of FIG. 9 show the behavior of the copper-containing glasses when the starting CuO batch content is specified in terms of $Cu_2O$. Curves 5 and 6 show the behavior of glasses of Examples 6 and 4, respectively, when the coefficient of thermal expansion is plotted against $Cu_2O$ content, where the $Cu_2O$ mole percent is based only on analyzed $Cu^+$ content of the glasses of Examples 6 and 4, respectively. Unlike curve 3 in FIG. 8 for which the data is derived from FIG. 2, the coefficient of thermal expansion data, derived from FIG. 3, do not yield a single $Cu^+$ curve. In FIG. 2, it is seen that all of the softening point curves converge at a common point coincident with the $Zn^{2+}$ curve (curve 4, FIG. 2). In FIG. 3, no such coincidence of coefficient of thermal expansion curves is observed.

Addition of alkali metal oxides to the solder glasses increases their coefficient of thermal expansions as shown in FIG. 9. An increase of $Cu^+$, curves 5 and 6 of FIG. 9, decreases the coefficient of thermal expansion. In the actual glasses, however, curves 3 and 4 of FIG. 9, in which the $Cu^+$–$Cu^{2+}$ equilibrium obtains, the effect of the $Cu^+$ ion is mitigated by the behavior of the $Cu^{2+}$ ion. The overall effect of the mixed copper ion system on the coefficient of thermal expansion is to cause a small increase with increase in total copper content.

It is well known that lead borate based solder glasses are not resistant to attack by acid media. In many applications, however, they exhibit an acceptable weathering resistance. Since weathering resistance is related to water solubility and hygroscopicity, these are measured on selected samples. Some of the results are shown in Table I. Results on commercial glasses are also presented for comparison. Although there seems to be a slight increase in water solubility with increasing total copper content of the glasses, the copper glasses exhibit relatively low values compared to the other glasses examined. No effect due to variation in valency state of the copper is evident. When the CuO in the batch is replaced by $Na_2O$, both the water solubility and hygroscopicity increase dramatically. Again, therefore, the behavior of $Cu^+$ is found to be quite different from that of an alkali ion in the solder glass, in this instance a sodium analog.

Table I

| Glass | $O_2$-Bubbling Temperature | Density (g/cm³) | Water Solubility (mg/cm³) | Hygroscopicity (mg/cm³) |
|---|---|---|---|---|
| Example 7 | 1028° C | 5.48 | 5.3 | Not Detectable |
| Example 5 | 756° C | 5.48 | 6.3 | Not Detectable |
| Example 6 | 754° C | 5.51 | 5.8 | Not Detectable |
| Example 4 | 1007° C | 5.54 | 9.0 | Not Detectable |
| Example 4 | 758° C | 5.52 | 11.5 | Not Detectable |
| Example 9 | 860° C | 5.45 | 5.8 | Not Detectable |
| Example 11 | 907° C | 5.16 | 113.5 | 28.3 |
| Borosilicate-I*¹ | — | 2.13 | 18.5 | Not Detectable |
| Borosilicate-II*² | — | 2.23 | 0.4 | 0.2 |
| Soda-Lime*³ | — | 2.53 | 10.5 | 18.2 |

*¹Corning Code 7070
*² Corning Code 7740
*³ Owens-Illinois Code R-6

We claim:
1. A process for controlling the softening point, for minimizing lot by lot scattering of the softening point, and for providing preselected softening point of a solder glass containing copper oxide by controlling the $Cu^+$ concentration, comprising
   A. heating solder glass batch composition containing at least about 0.5% by weight of copper oxide calculated as cupric oxide to a temperature above the softening point of the composition to provide a homogeneous melt;
   B. bubbling oxygen-containing gas through said homogeneous melt for a time at least sufficient to achieve equilibrium of the reaction

$$Cu_2O + 1/2O_2 \rightleftharpoons 2CuO$$

and at a temperature and oxygen partial pressure predetermined to provide the desired $Cu^+$ concentration and preselected softening point of the solder glass; and thereby
   C. obtaining said solder glass containing copper oxide and having said preselected softening point.
2. The process of claim 1 wherein said solder glass is a vitreous glass.
3. The process of claim 1 wherein said solder glass contains from about 0.5% to about 20% by weight of copper oxide calculated as cupric oxide.
4. The process of claim 1 wherein said solder glass contains from about 1 to about 13% by weight of copper oxide calculated as cupric oxide.
5. The process of claim 1 wherein said solder glass has a softening point between about 300° and about 800° C.
6. The process of claim 1 wherein said solder glass has a coefficient of thermal expansion of about $30 \times 10^{-7}/°C$ to about $120 \times 10^{-7}/°C$.
7. The process of claim 1 wherein said solder glass is heated to a temperature of about 800° to about 1500° C to provide said homogeneous melt.
8. The process of claim 1 wherein said solder glass is heated to a temperature of about 1000° to about 1500° C to provide said homogeneous melt.
9. The process of claim 1 wherein said oxygen-containing gas is oxygen.
10. The process of claim 1 wherein said oxygen-containing gas is air.
11. The process of claim 1 wherein said oxygen-containing gas is a mixture of oxygen with nitrogen and/or inert gas.
12. The process of claim 1 wherein the oxygen-containing gas is bubbled through said melt for at least about ½ hour.
13. The process of claim 1 wherein the oxygen-containing gas is bubbled through said melt for at least about 1 hour.
14. The process of claim 1 wherein the melt is at a temperature of about 350° to about 1250° C during the bubbling.
15. The process of claim 1 wherein the melt is at a temperature of about 500° to about 1100° C during the bubbling.
16. The process of claim 1 wherein the maximum oxygen partial pressure during the bubbling is about 1 atmosphere.
17. The process of claim 1 wherein the maximum oxygen partial pressure during the bubbling is about 1 atmosphere and the melt is at a temperature wherein substantially all of the copper in the melt is $Cu^{2+}$.
18. The process of claim 1 which further includes cooling the melt after bubbling to a point wherein the minimum viscosity of the glass is about $10^3$ poises.
19. The process of claim 18 wherein the rate of said cooling is at least about 100° C/hour.
20. The process of claim 1 which further includes bringing the solder glass after bubbling to a temperature of about 100° to about 170° C above the softening point of the solder glass whereat it exhibits a viscosity of about $10^3$ to about $10^4$ poises and then forming said glass into cane.
21. The process of claim 18 which further includes forming said glass into frit.
22. The process of claim 1 wherein the softening point is changed by about 11° to about 16° C for every 1% change in the percent of $Cu^+$ in the glass.

* * * * *

UNITED STATES PATENT AND TRADEMARK OFFICE
CERTIFICATE OF CORRECTION

PATENT NO. : 4,011,060
DATED : March 8, 1977
INVENTOR(S) : Melvin Berkenblit et al It is certified that error appears in the above-identified patent and that said Letters Patent are hereby corrected as shown below:

Column 4, line 2, change "300°" to -- can --.

Column 6, line 5, after "achieved" insert -- regardless --.

Column 12, line 29, change "$P_o$" to -- $P_{O_2}$ --.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*